United States Patent [19]
Jones et al.

[11] Patent Number: 5,768,627
[45] Date of Patent: Jun. 16, 1998

[54] EXTERNAL PARALLEL-PORT DEVICE USING A TIMER TO MEASURE AND ADJUST DATA TRANSFER RATE

[75] Inventors: Larry Jones, Palo Alto; Arockiyaswamy Venkidu, Menlo Park; Sreenath Mambakkam, San Jose, all of Calif.

[73] Assignee: On Spec Electronic, Inc., Santa Clara, Calif.

[21] Appl. No.: 573,497

[22] Filed: Dec. 15, 1995

[51] Int. Cl.$^6$ ............................ G06F 15/02; G06F 13/14
[52] U.S. Cl. .................. 395/880; 395/878; 395/557; 395/835
[58] Field of Search ........................ 395/882, 500, 395/828, 830, 835, 800, 878, 880, 557

[56] References Cited

U.S. PATENT DOCUMENTS

| | | | |
|---|---|---|---|
| 4,772,131 | 9/1988 | Varela et al. | 374/119 |
| 5,157,769 | 10/1992 | Eppley et al. | 395/200 |
| 5,220,659 | 6/1993 | Larson et al. | 395/500 |
| 5,264,850 | 11/1993 | Khorram | 341/155 |
| 5,268,906 | 12/1993 | Free | 371/5.5 |
| 5,276,443 | 1/1994 | Gates et al. | 340/825.06 |
| 5,293,497 | 3/1994 | Free | 395/325 |
| 5,335,338 | 8/1994 | Proesel | 395/500 |
| 5,568,403 | 10/1996 | Deiss et al. | 364/51.4 R |
| 5,581,795 | 12/1996 | Maupin et al. | 395/882 |

OTHER PUBLICATIONS

Dickerson, "68HC05-based system design; antilock brake systems are real-world embedded systems", Dr. Dobb's Journal, v20, n8 p68(6), Aug. 1995.

*Primary Examiner*—Thomas C. Lee
*Assistant Examiner*—Rehana Perveen
*Attorney, Agent, or Firm*—Stuart T. Auvinen

[57] ABSTRACT

The timing of control signals in a parallel port is measured and adjusted to achieve optimum timing of these control signals. At boot-up, a routine writes alternating data to the control register of the parallel port. The control register drives control signal over a parallel-port cable to an external parallel-port device connected to the parallel port of a personal computer (PC). Transitions of the control signal trigger an external timer in the external parallel-port device which measures the pulse width of the control signal. The measured pulse width is sent back to the PC over the parallel cable and compared to a target pulse width. When the measured pulse width is less than the target, additional intervening instructions are inserted between writes to the parallel-port control register. The intervening instructions are a simple delay loop. Alternately the internal timer on the PC may be used. Since the accuracy is less for the internal timer, many IO writes are performed to average out errors. Several external devices having cross-over adapters may be coupled together and addressed separately. Two of the ground signals in the parallel port are used as addressing grounds.

14 Claims, 8 Drawing Sheets

EXTERNAL PARALLEL-PORT DEVICE USING A TIMER TO MEASURE AND ADJUST DATA TRANSFER RATE

BACKGROUND OF THE INVENTION

1. Field of the Invention

This invention relates to Personal Computers (PC's), and more particularly to adapters for the Parallel Port of a PC.

2. Description of the Related Art

Personal computers (PC's) have become the best-selling computer of all times. While PC's were originally manufactured by International Business Machines (IBM) of Armonk, N.Y., many vendors now make PC's in an intensely competitive market. One desirable feature is that PC's use industry-standard busses and communication ports, allowing easy expansion by the end user.

Early PC's had a serial port and a parallel port, usually located on the rear panel of the chassis. The serial port was used to communicate data in a serial fashion to external devices such as modems and mice, while the parallel port was used to communicate 8 bits of data in parallel to a printer. The connection of an external printer to the parallel port is so common that it is also known as the printer port.

The types and number of external devices that connect to the serial and parallel ports of a PC has grown over the years. While once just a printer was attached to the parallel port, now many users have two printers—a high-quality laser printer and a draft-mode dot-matrix printer. Other devices have also appeared that connect to the parallel port. These devices include external disk drives, tape drives, CD-ROM drives, and local-area network adapters. Data transfer to a portable PC such as a Laptop or Notebook can occur over a special cross-wired serial or parallel cable that connects a desktop PC to the portable PC.

A particular problem with these devices using the parallel port is the lack of a definite timing standard for parallel port signals. The timing of signals in the parallel port is determined by I/O write cycles to update an I/O port which drives the control signals in the parallel port. When a bit in the parallel port's control register is written, a transition occurs for a control signal output to the parallel port device. The next transition of that control signal cannot occur until the next I/O write cycle to the control register. Thus the timing of transitions of parallel-port control signals is determined by the timing of I/O write cycles to the parallel-port control register.

The timing of the I/O writes to the parallel-port control register is determined by the speed of the ISA or AT bus on the PC, since the parallel port is coupled to the expansion AT bus. The original IBM PC-AT used a 8 MHz AT-bus clock, but other PC manufacturers increased the frequency of the AT-bus clock to 10 or even 12 MHz. These higher-frequency AT busses affect parallel-port control signals. Since the parallel port often drives a long cable, the higher-frequency transitions may cause failures.

The program which writes data to the parallel-port control registers may also affect the timing of the control signals. For example, when back-to-back I/O writes occur, control signal transitions occur more rapidly than when additional instructions are processed between I/O write instructions. Another factor when additional instructions are executed between I/O writes is the speed of the CPU and memory: faster CPU's can process these intervening instructions more rapidly and thus the transitions occur more closely together. When the instructions are cached, rather than fetched from slower memory, the intervening instructions can be processed even more rapidly.

These many factors that affect the timing of parallel-port control signals make high-performance operation of the parallel port difficult. To operate at peak performance, the control-signal transitions must occur as rapidly as possible, but not so rapidly that errors occur. When software is written to communicate with external devices on the parallel port, the software must operate correctly on any PC, with any speed AT bus or CPU. Performance on slower PC's is lost when the software is optimized for error-free operation on high speed PC's.

A prior-art solution is disclosed by Free in U.S. Pat. No. 5,268,906 assigned to Traveling Software of Bothell, Wash. The timing of a parallel-port control signal is decremented until a data error is detected. This method is useful when two PC's are connected by their parallel ports since the PC's may operate at different speeds. The speed of each PC is not measured and the transfer rate is not set to a pre-determined optimum setting. The method is not been applied to a PC connected to an external peripheral device on the parallel port since the peripheral device may not be able to detect errors or distinguish the errors from normal data unless some intelligence is added to the peripheral device.

It is desirable to optimally operate the parallel port. It is desired to adjust the transitions of control signals for the parallel port so that data is transferred at an optimum rate but without errors. What is desired is to determine the speed of the AT bus and adjust the parallel-port software for the AT bus speed. It is desired to make an adjustment using software to the timing of parallel-port control signals to account for the actual speed of the AT bus on the user's PC.

SUMMARY OF THE INVENTION

An external device connects to a parallel port of a personal computer (PC). The external device has a parallel-port connector for connecting to a parallel-port cable connected to the parallel port of the PC. A data register is connected to the parallel-port connector. The data register stores data transferred from the PC to the external device. A control register is also connected to the parallel-port connector. The control register buffers control signals which include a first control signal from the PC to the external device.

A status register is also connected to the parallel-port connector. The status register drives status signals from the external device to the PC. A controller means is coupled to the data register, the control register, and the status register. The controller means receives data and commands from the PC to the external device. An external timer is coupled to the controller means. It times the first control signal from the control register. The external timer is triggered by a first edge of the first control signal and halted by a second edge of the first control signal. The external tinier outputs a count value indicating an amount of time from the first edge to the second edge of the first control signal.

Thus the external timer in the external device measures a pulse width of the first control signal from the parallel port of the PC.

In further aspects of the invention the controller means also has a transfer means for reading the count value from the external timer and transferring the count value to the parallel port of the PC. A compare means compares the count value to a target count value. The target count value is proportional to a target pulse width for the first control signal. An extension means in the PC is responsive to the compare means. It extends a period of time between the first edge and the second edge of the first control signal. Thus the pulse width of the first control signal is extended when the compare means indicates that the count value is less than the target count value.

In still further aspects of the invention the extension means has a means for inserting delay instructions between adjacent IO write instructions that write to a parallel-port control register in the PC which drives the first control signal on the parallel-port cable. Thus the pulse width of the first control signal is extended by inserting delay instructions between adjacent IO write instructions. The delay instructions make up a loop. The extension means adjusts a number of times the loop is repeated between IO write instructions.

In other aspects of the invention the extension means and the compare means are a parallel-port driver software routine executing on the PC. The compare means is executed during initialization of the PC, and the extension means is executed when data is transferred from the PC to the external device.

DETAILED DESCRIPTION

Figure 1:
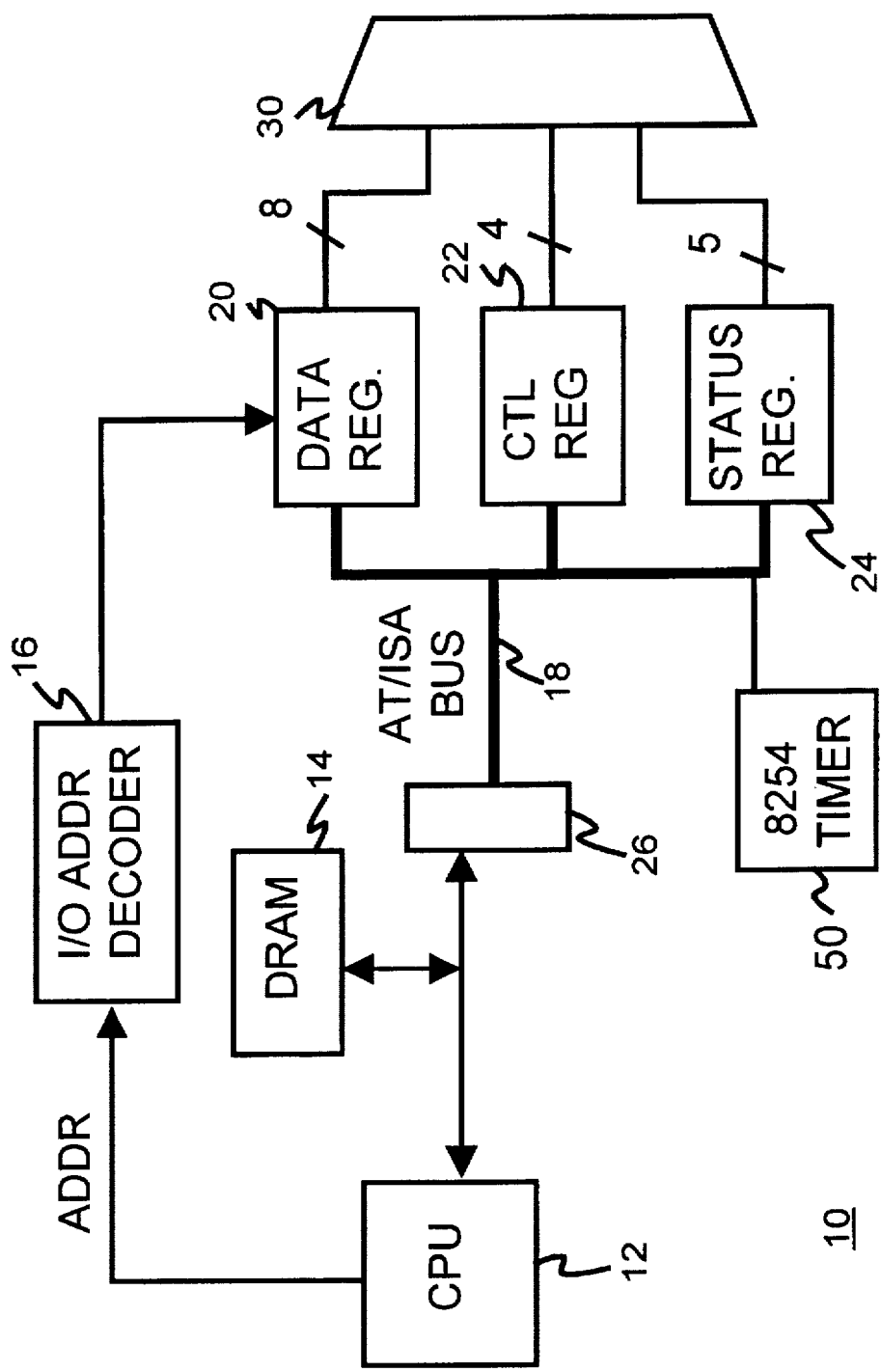
FIG. 1 shows parallel-port I/O registers within a PC.

The present invention relates to an improvement in personal computers. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

The parallel port in a PC is described in more detail in U.S. Pat. No. 5,293,497, Issued to Gordon Free and assigned to Traveling Software of Bothell, Wash. The parallel port uses a 25-pin D-type connector, and has 17 data and signal lines with the remaining 8 lines being ground.

The 17 signals include 8 data bits, 5 status lines and 4 control signals. In the original parallel port, the 8 data lines are sent from the PC to the printer, while the 5 status signals are received from the printer. The 4 control signals are also from the PC. A simple handshake is used where the PC outputs the data and raises a strobe control signal. Data is left on the parallel port data line until the printer responds by activating the acknowledge (ACK) status signal. Other handshakes have been devised to speed up the data transfer. For instance, the auto line-feed AFD signal is often used as a timing signal to indicate when to latch data from the parallel cable. Table 1 shows the signals in the parallel port and their function.

TABLE 1

| Parallel Port Signals | | |
|---|---|---|
| Type | Function | Pin Number |
| Data | bit 0 | 2 |
|  | bit 1 | 3 |
|  | bit 2 | 4 |
|  | bit 3 | 5 |
|  | bit 4 | 6 |
|  | bit 5 | 7 |
|  | bit 6 | 8 |
|  | bit 7 | 9 |
| Control | Strobe | 1 |
|  | Auto Line Feed | 14 |
|  | Initialize | 16 |
|  | Select Printer/Device | 17 |
| Status | Acknowledge | 10 |
|  | Busy | 11 |
|  | Paper Out | 12 |
|  | On-Line | 13 |
|  | Error | 15 |

The signals in the parallel port are divided into three types: data and control from the PC, and status from the printer or other external device. FIG. 1 shows that these three divisions each have an I/O register within PC 10. Many of the control and status signals are active-low signals rather than active-high signals. Active-low signals have better noise immunity for TTL-voltage-level signals that are commonly used in PC's.

PC 10 of FIG. 1 has a central processing unit (CPU) 12 which executes instructions stored in main memory 14 or in ROM (not shown). Buffer 26 separates the main memory 14, usually DRAM, from the industry-standard (ISA) bus, also known as the AT bus 18. This expansion bus typically has expansion slots so that end users can add AT expansion boards to upgrade or enhance their PC. Decoder 16 receives addresses from CPU 12, either directly or more commonly through address buffers (not shown). Decoder 16 generates select signals and possibly timing signals so that data may be written to or from parallel port I/O registers 20, 22, 24. These I/O registers include data register 20, control register 22, and status register 24. These I/O registers 20, 22, 24 connect to parallel port connector 30, which is usually mounted on the back panel of the PC's chassis. Timer 50 such as one compatible with Intel's 8254 timer is typically accessible through AT bus 18.

Figure 2:
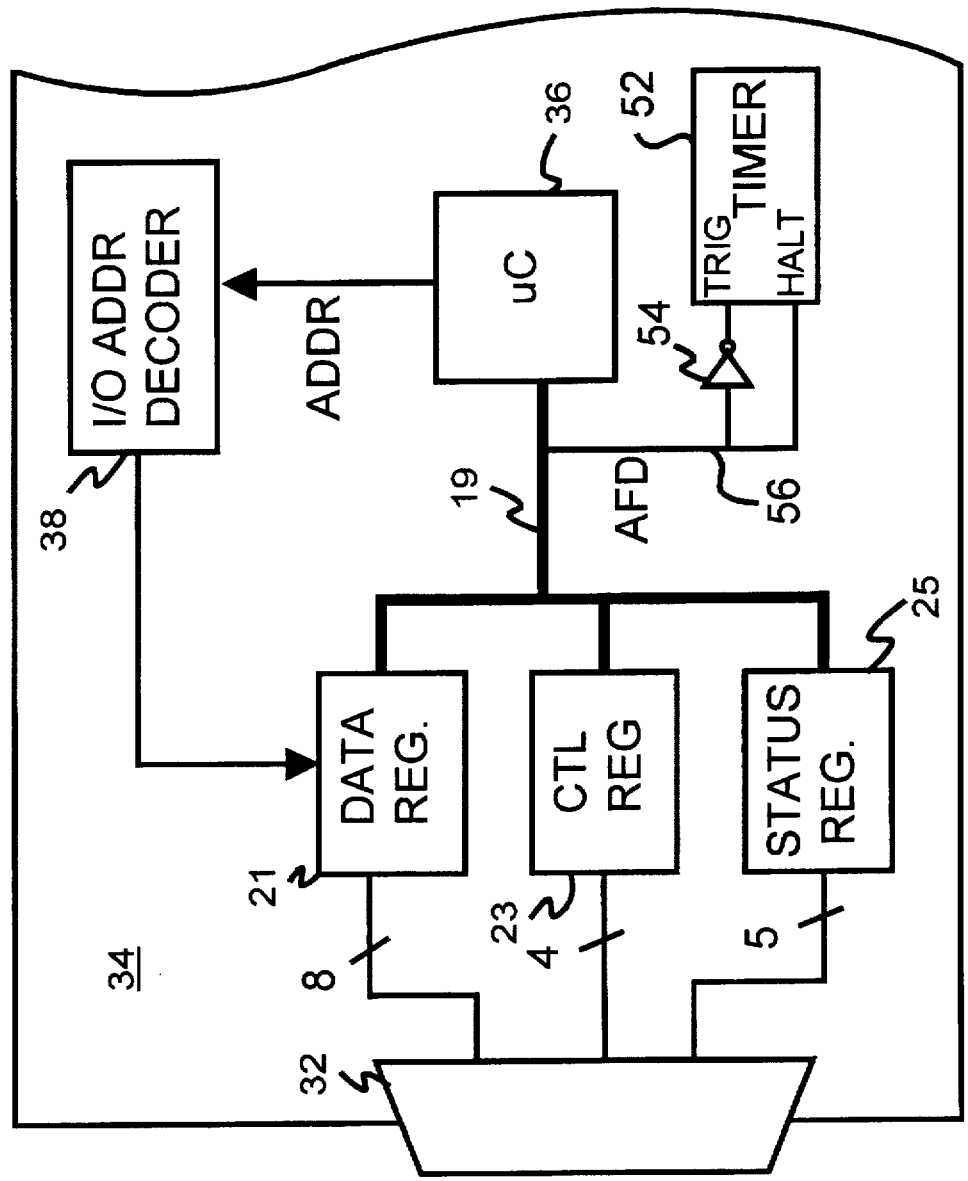
FIG. 2 shows a cable plugged into a parallel-port connector on external parallel device.

One end of a parallel cable is typically plugged into connector 30. FIG. 2 shows that the other end of the cable is plugged into connector 32 on external parallel device 34. External parallel device 34 could be a printer, disk or tape drive, or other peripheral, or a controller for these devices. Only the interface portion of external parallel device 34 is shown. External parallel device 34 also contains a data register 21, control register 23, and status register 25, Control register 23 is preferably a transparent latch so that transitions on control signals received from the PC are immediately seen by timer 52. Usually a microcontroller 36 is used to provide control by executing routines in firmware that perform communication with the parallel port, and control the printer or other external parallel device 34. Microcontroller 36 provides a read/write indication to registers 21, 23, 25, and addresses to decoder 38, which decodes the addresses and selects a register for reading or writing.

Timer 52 is provided in one embodiment to determine the actual time between transitions on a parallel-port control signal such as auto line-feed (AFD) signal 56. Timer 52 is reset by microcontroller 36. The next low-going transition of AFD signal 56 triggers timer 52 through inverter 54. Once triggered, timer 52 is incremented during each timer-clock period until a low-going transition of AFD signal 56 halts the counting of timer 52. Once halted, timer 52 is read by microcontroller 36 and the halted count value sent as data through connector 36 to the host PC 10.

Figure 3:
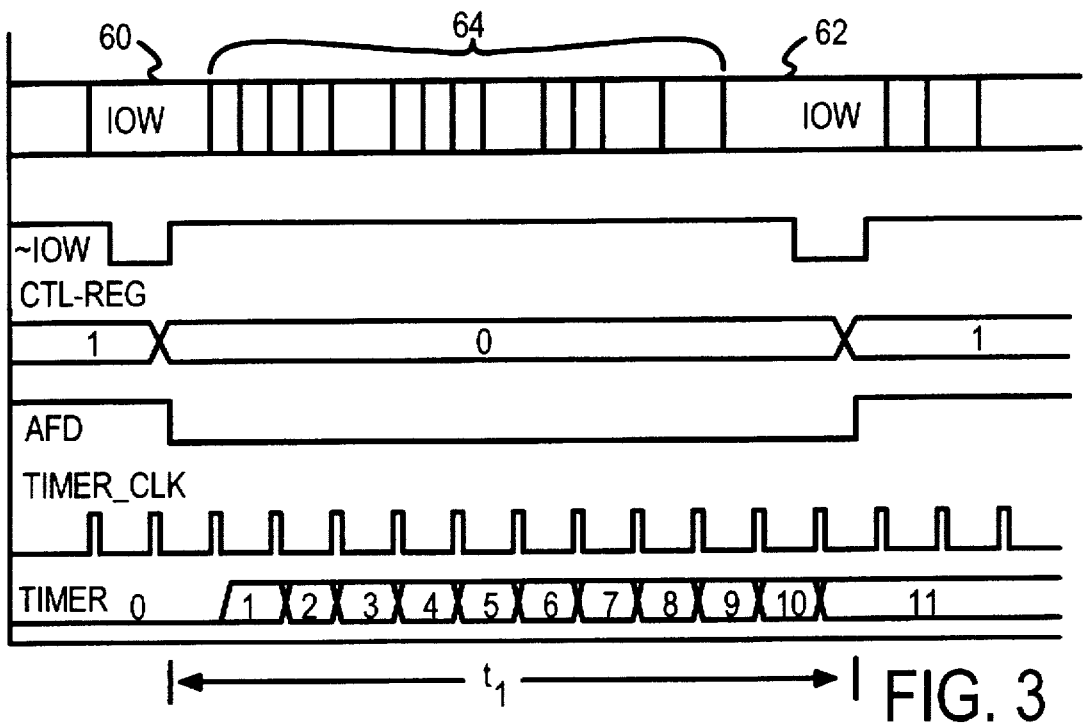
FIG. 3 is a timing diagram of a parallel-port control signal being measured by a timer on an external parallel-port device.

FIG. 3 is a timing diagram of a parallel-port control signal being measured by a tinier on an external parallel-port device. On PC 10, I/O write cycle 60 generates an active-low pulse of the I/O write signal –IOW which writes the value 1 to the bit in control register 22. As I/O write cycle 60 changes the value of the bit in control register 22, the auto line-feed AFD control signal in the parallel port is driven low. When this high-to-low transition of AFD is received by external parallel device 34, timer 52 is triggered and begins incrementing on each pulse of the timer clock.

I/O write cycle 62 writes a 0 to the bit in control register 22 which drives the AFD control signal high. When this low-to-high transition of AFD is received by external parallel device 34, timer 52 halts and stops incrementing on each pulse of the timer clock. The final count of timer 52 is then read by microcontroller 36 and transferred to a software program which drives the parallel port in PC 10. The final count, multiplied by the time between pulses of the timer clock, is the time measured between I/O write cycles, $t_1$.

IO write cycles 60 and 62 may be adjacent to each other, but more typically some number of intervening instructions 64 separate IO write 60 from IO write 62. The number and length of intervening instructions 64 partially determines the low pulse width of the AFD control signal. The more instructions in intervening instructions 64, the longer the low pulse width of AFD.

The length of time spent executing intervening instructions 64 can vary. Occasionally an interrupt is received and processed by the PC. An interrupt service routine is called which executes additional instructions. Each type of interrupt can have a different number of instructions in its interrupt service routine. A DRAM refresh cycle may also occur during execution of intervening instructions 64, further increasing delay. Since interrupts and DRAM refresh can occur irregularly and infrequently, the pulse width of AFD is occasionally extended. This extension of AFD because of an interrupt or refresh merely reduces performance of the data transfer to the parallel port during normal operation. However, when the test to determine the AT bus speed is performed, it is important to measure the minimum pulse width of AFD. Thus interrupts are disabled during the speed test. DRAM refresh cannot be disabled without loss of data.. Since DRAM refresh is much more rapid than interrupt processing the affect is minimal.

AT-Bus Speed Test Using Timer in External Device

Figure 4A:
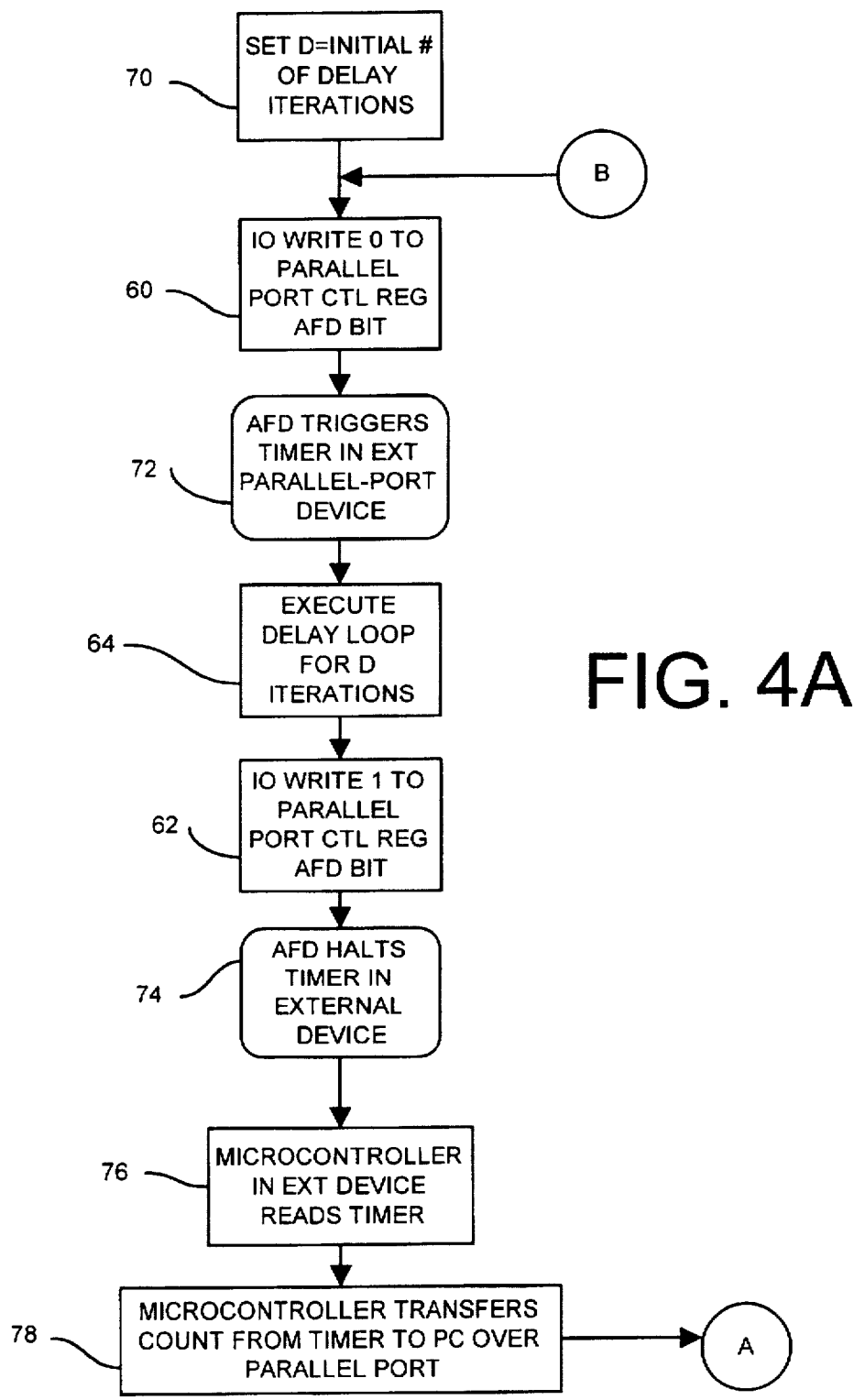
FIGS. 4A, 4B show a flowchart for a test to measure the speed of the AT-bus accessing the parallel port.
Figure 4B:
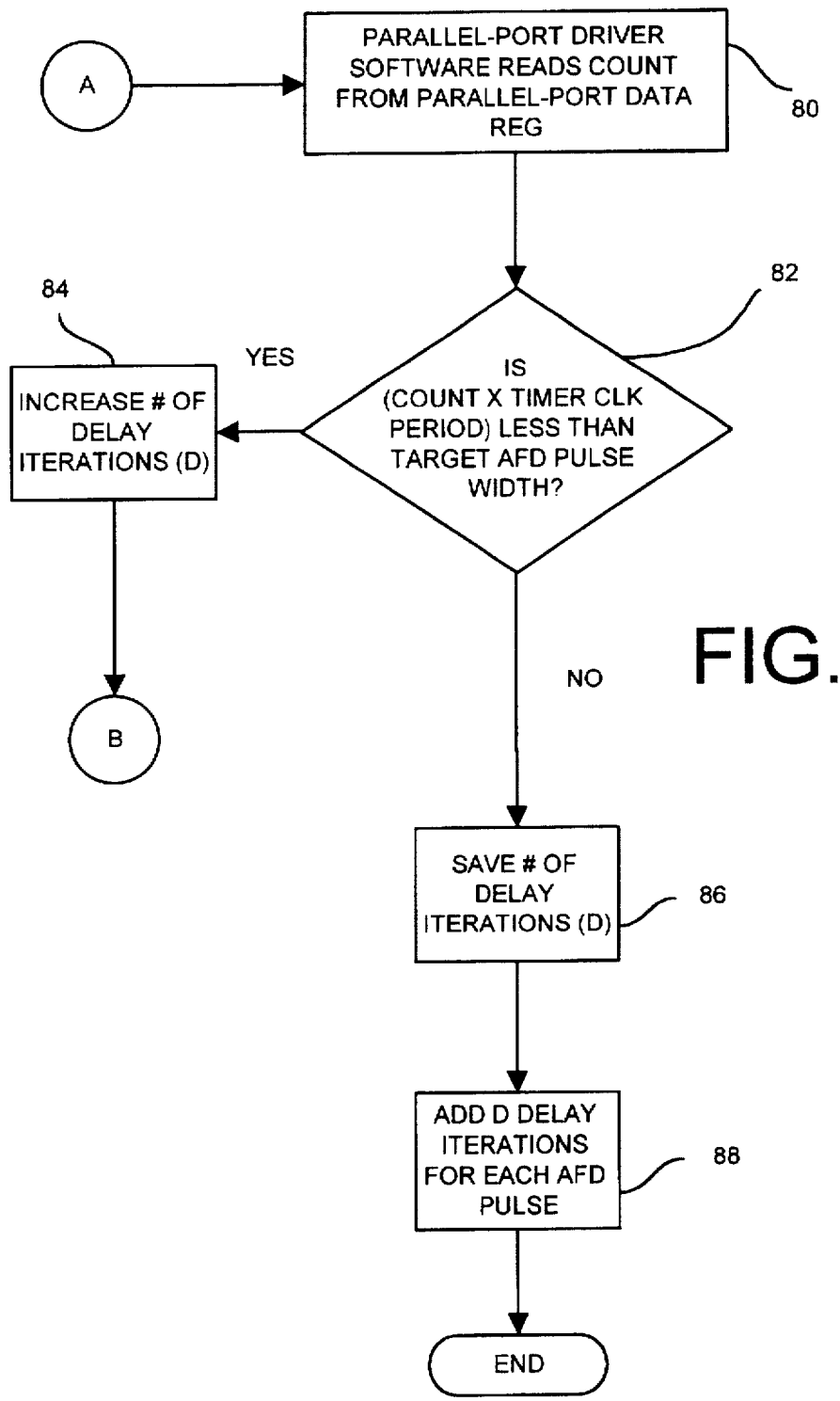

FIGS. 4A, 4B show a flowchart for a test to measure the speed of the AT-bus accessing the parallel port. An initial value for the number of instructions in intervening instructions 64 is set, step 70. This initial value for D is a loop value which determines the number of times a loop is executed. IO write cycle 60 to the parallel port control register writes a one to the bit that drives the auto line-feed AFD control signal. The low-going edge of AFD is transmitted across the parallel cable to the external parallel-port device where the external timer is triggered, step 72. Intervening instructions 64 are executed by repeating a delay loop for D iterations. IO write 62 uses an AT-bus cycle to write a zero to the AFD signal bit in the parallel-port control register. The rising edge of AFD is driven over the parallel cable to the external parallel-port device where the external timer is halted and stops counting, step 74. The microcontroller in the external parallel-port device then reads the halted count value from the external timer, step 76, and transfers this count value over the parallel port cable to the parallel-port data register in the host PC, step 78.

Continuing on FIG. 4B, the parallel-port driver software reads the count value in the parallel-port data register, step 80. The driver software multiplies the count value by the time period for the external timer's clock to determine the period of time for the adjacent IO writes 60, 62, which is $t_1$, from FIG. 3. This measured time period is compared to a target time period, step 82. The target time period is a reference time period for a standard PC-AT using an 8 MHz AT bus. This target can be measured by a logic analyzer or calculated from AT-bus timing specifications. The target measured on the reference system is 750 nanoseconds (nsec).

When the measured time period $t_1$ is less than the target the pulse width for AFD is too small and must be increased. In step 84 the value for D is increased and then the test is repeated starting with IO write 60 of FIG. 4A. D is incremented by 1, although larger increment values could be used, or even a variable increment value.

When the measured time period $t_1$, is not less than the target, the test is completed. Step 86 saves the last value for D, the number of iterations in the delay loop in intervening instructions 64. The value for D may be increased slightly by the amount D was increased in the last test to make D equal to or slightly greater than the target (not shown). The AT-bus speed test is completed. Each time data is transferred to the external parallel port device a delay loop (step 88) having D iterations is inserted between each adjacent IO write cycle to achieve the target pulse width for the AFD control signal, which is used to strobe data.

AT-Bus Speed Test Using PC's Internal Timer

The previously-described embodiment uses an external timer in the external parallel-port device. However, the invention may also be practiced without the external timer. Instead the PC's internal timer is used. All personal computers have an 8254-compatable timer 50 which can be accessed over AT bus 18 of FIG. 1. The 8254 timer may be used to measure the speed of the AT bus.

While the external timer is triggered directly by the parallel-port control signal AFD, the internal 8254 timer cannot be triggered by the parallel-port signals since the parallel port is not connected to the internal timer. Indeed, a spare, unused timer may not be available. Instead a timer is shared that is being used for another purpose such as the real-time clock, DRAM refresh, or speaker sound. Since the timer is being used for another purpose, it cannot be stopped, reset, or written to by the parallel-port software. The parallel-port software can only read the count value in the shared timer.

A simple approach is to read the internal timer, save the first count read, then execute the two IO writes and intervening instructions, and read the internal timer a second time. The difference between the first and second count values read from the internal timer is the time elapsed for the AFD pulse generated by the two IO write cycles. This simple approach is less accurate since the timer is read before and after the actual AFD pulse, rather than exactly on the edges of the AFD signal. To reduce this inaccuracy the many IO write cycles are executed separated by many loops of intervening instructions.

Figure 5:
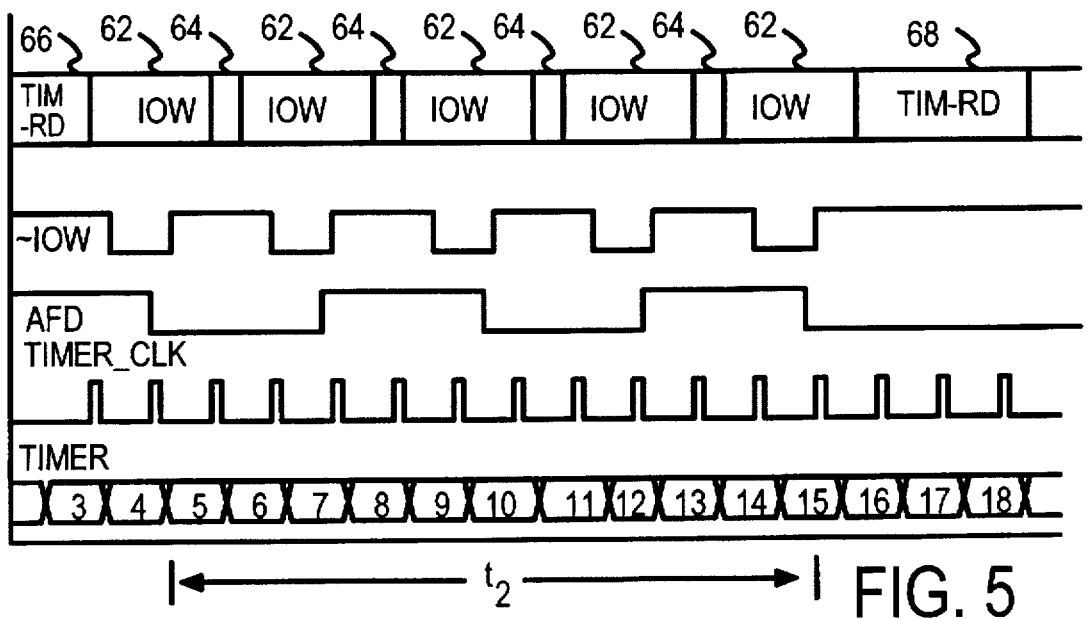
FIG. 5 illustrates an AT-bus speed test using many IO write cycles which are reduce inaccuracy.

FIG. 5 illustrates an AT-bus speed test using many IO write cycles which are averaged to reduce inaccuracy. The internal timer is first read by timer read instruction 66. Then many IO write cycles 62 are executed separated by many loops of intervening instructions 64. Finally the internal timer is again read by second timer read instruction 68. The difference in count values read during timer read instruction 66 and second timer read instruction 58 is the time elapsed for the many IO writes and their intervening instructions, $t_2$. The actual count value read is not important since the internal timer is free-running. FIG. 5 shows the first count value read by timer read instruction 66 is 3, while the second count value read by second timer read instruction 68 is 18. The difference is 15. When the timer tick internal timer is used, the timer is; incremented every 518 nsec. Thus the elapsed time is 15×518 nsec=7.8 microseconds (µsec). Since there were 5 IO write instructions 62, each IO write takes 7.8 µsec/5=1.56 µsec.

The target for the AFD pulse width, the time for each IO write instruction 62 and the intervening instructions 64 is 750 nsec. For five IO-writes, the target is multiplied by five to give a target of 3.75 µsec. Since the measured elapsed time $t_2$ is less than the target, additional instructions must be executed between adjacent IO writes to widen the AFD pulse width.

Figure 6:
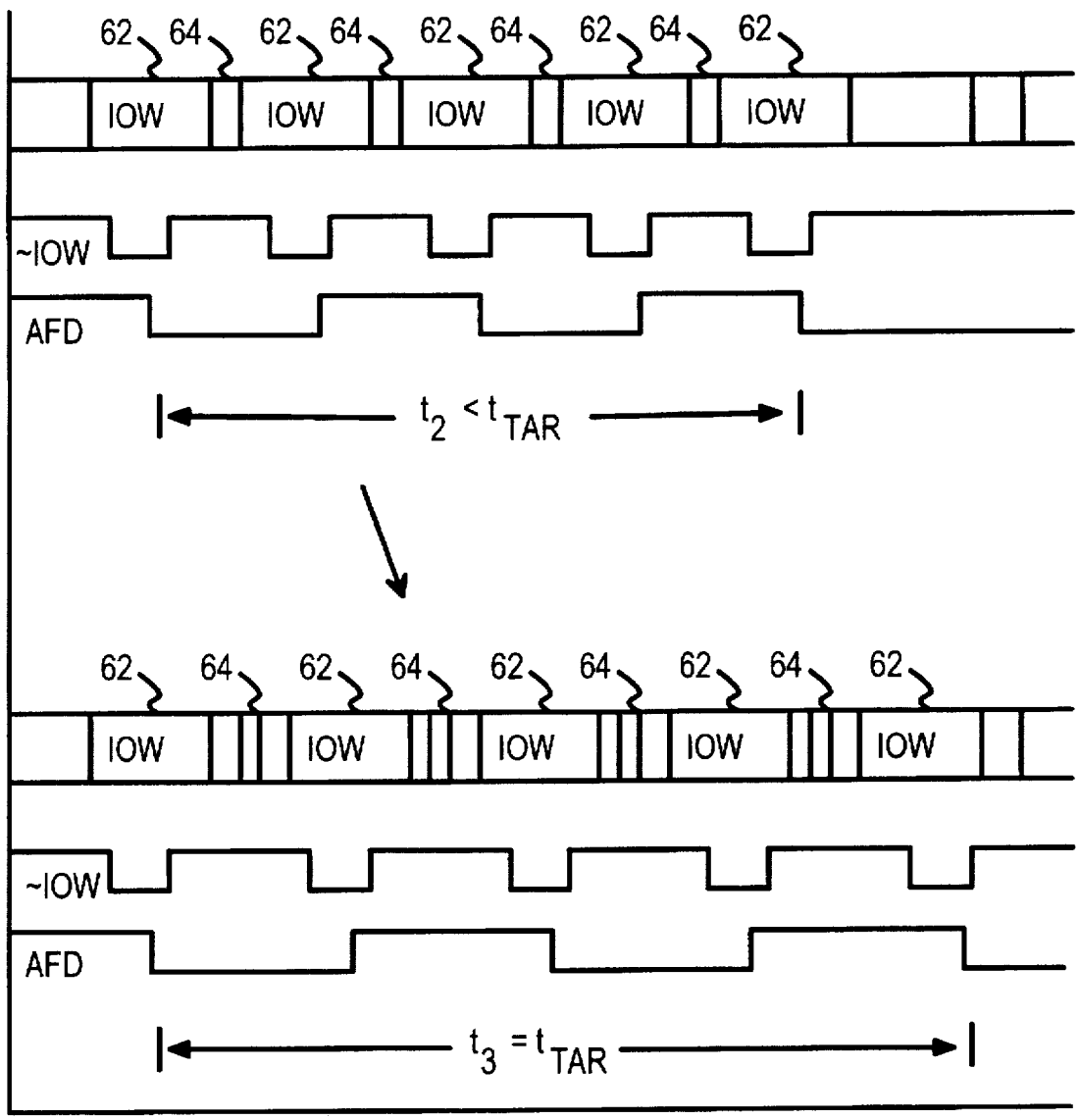
FIG. 6 shows an initial speed test with only one intervening instruction between adjacent IO writes and the final speed test with three intervening instructions which meet the target for AFD pulse width.

FIG. 6 shows an initial speed test with only one intervening instruction between adjacent IO writes and the final speed test with three intervening instructions which meet the target for AFD pulse width. In the initial speed test at the top half of FIG. 6 just a single intervening instruction 64 occurs between adjacent IO writes 62. The measured elapsed time, $t_2$, is less than the target. Additional intervening instructions are inserted between adjacent IO write instructions 62 until the measured elapsed time is equal to or greater than the target. The bottom half of FIG. 6 shows the final speed test where three intervening instructions 64 occur between adjacent IO write instructions 62. The measured elapsed time $t_3$ meets the target $t_{TAR}$. The count value of three intervening instructions is saved. Each time data is transferred to the external parallel-port device the driver software executes the three intervening instructions to add the correct delay between adjacent IO write instructions.

Operation of AT-Bus Speed Test Using Internal Timer

Figure 7A:
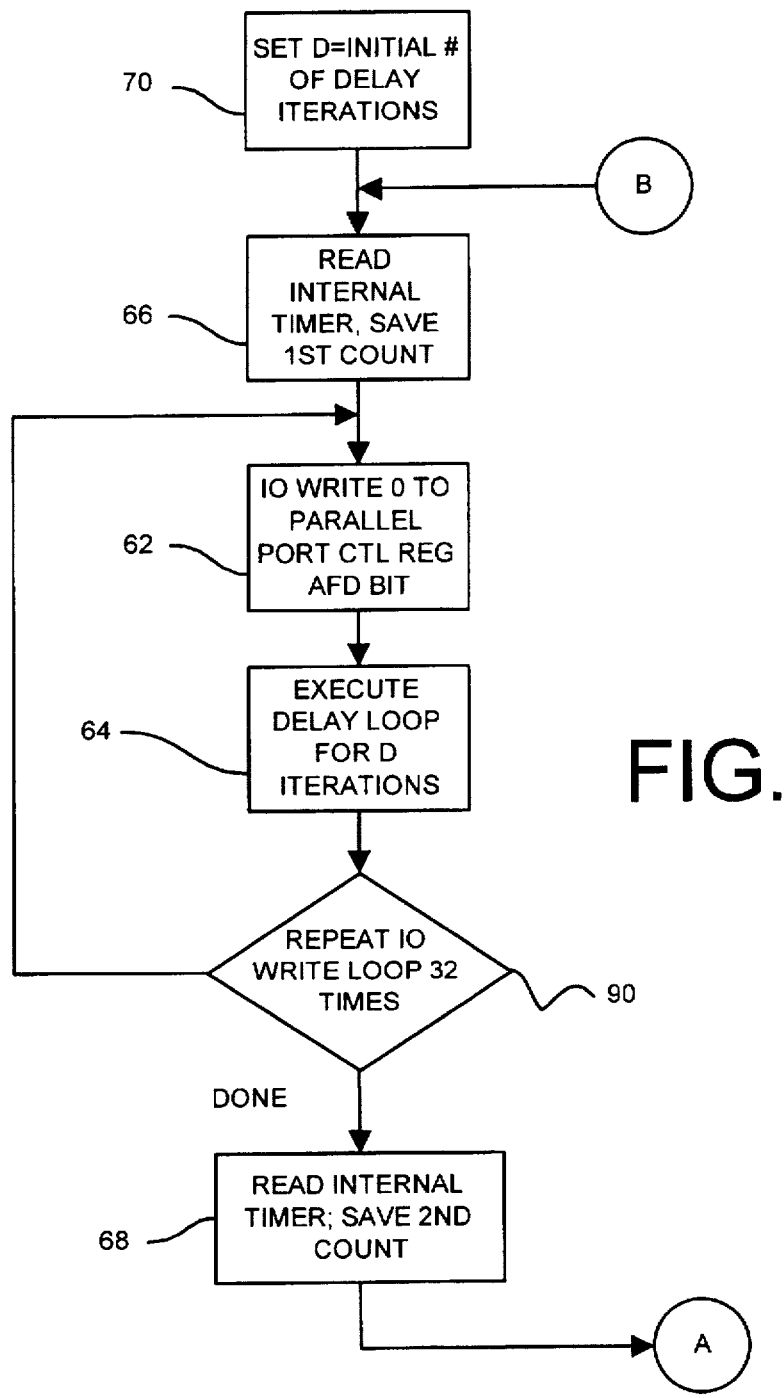
FIGS. 7A, 7B show a flowchart for an AT-bus speed test routine which used the internal timer on a PC.
Figure 7B:
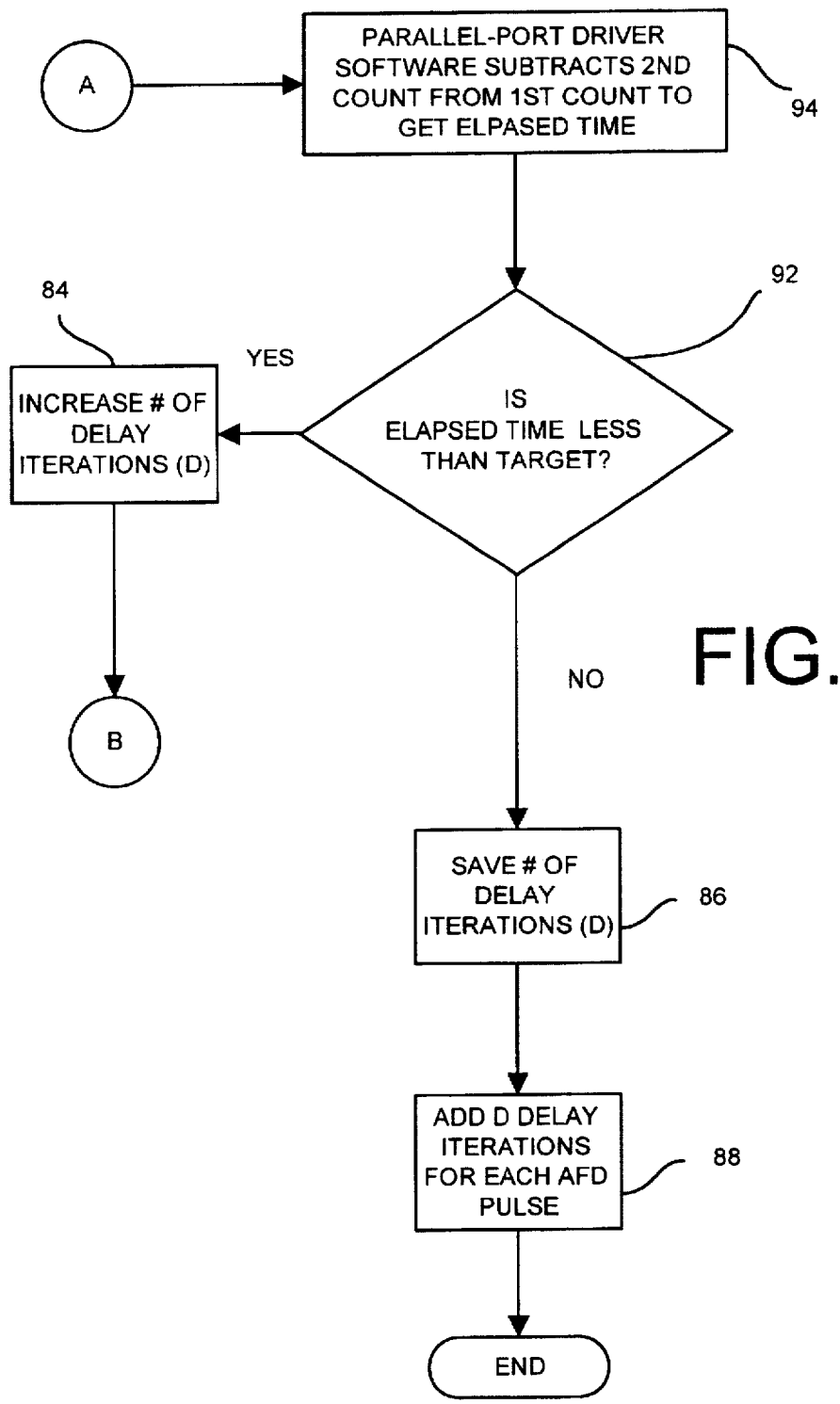

FIGS. 7A, 7B show a flowchart for an AT-bus speed test routine which used the internal timer on a PC. An initial value for the number of instructions in intervening instructions 64 is set, step 70. This initial value for D is a loop value which determines the number of times a delay loop is executed.

The PC's internal timer is read during timer read instruction 66 and the first count value is saved either to the stack in memory or in an internal register on the CPU. IO write cycle 62 to the parallel port control register writes a zero or a one to the bit that drives the auto line-feed AFD control signal. Intervening instructions 64 are executed by repeating a delay loop for D iterations. To reduce inaccuracy of reading the internal timer, many IO write instructions 62 and intervening instructions 64 are executed. In the preferred embodiment 32 IO writes are executed in a write loop. Once instructions 62, 64 have been repeated for a total of 32 times, step 90, the internal timer is again read in second timer read instruction 68. The second count value is saved.

Continuing on FIG. 7B, the parallel-port driver software subtracts the second count value from the first count value to get the elapsed time, step 94. It is possible that the internal timer has rolled over since the timer is a modulo counter. Should the difference be negative an adjustment is made by taking the two's complement of the difference to obtain a positive difference. The difference is the elapsed time, $t_2$ from FIGS. 5, 6. This measured time period is compared to a target time period, step 92. The target time period is a reference time period for 32 IO writes and an optimum number of intervening instructions on a standard PC-AT using an 8 MHz AT bus. This target can be measured by a logic analyzer or calculated from AT-bus timing specifications. The target measured on the reference system is 750 nsec.

When the measured time period $t_2$ is less than the target, the pulse width for AFD is too small and must be increased. In step 84 the value for D is increased and then the test is repeated starting with timer read instruction 66 of FIG. 7A. D is incremented by 1, although larger increment values could be used, or even a variable increment value.

When the measured time period $t_2$ is not less than the target, the test is completed. Step 86 saves the last value for D, the number of iterations in the delay loop in intervening instructions 64. The value for D may be increased slightly by the amount D was increased in the last test to make D equal to or slightly greater than the target (not shown). The AT-bus speed test is completed. Each time data is transferred to the external parallel port device a delay loop (step 88) having D iterations is inserted between each adjacent IO write cycle to achieve the target pulse width for the AFD control signal, which is used to strobe data.

Since data does not have to be read by the external parallel-port device, the value of the data written to the AFD bit in the parallel port register is not relevant. Indeed, the I/O write could occur to a different address on the AT bus instead of the parallel port, as long as the timing is the same as for writes to the parallel port. In a preferred embodiment IO write instruction 62 is replaced with an IO read instruction which reads the parallel port control register. The overall timing for IO reads is almost the same as the timing for IO writes. The advantage of using IO reads rather than IO writes is that IO reads are non-destructive and cause no activity on the parallel cable. Thus the external parallel-port device does not have to explicitly ignore the parallel port data during the speed test. The speed test can be performed at boot up even when a different parallel-port device is connected to the PC since no data is actually sent out over the parallel port during the speed test when the internal timer is used with IO reads rather than IO writes.

Assembly-Language Code for Speed Test

The Appendix shows a listing for an AT-bus speed test using the PC's internal timer. The subroutine get_time reads the internal timer before the test and leaves the first count in the bx register in the CPU. The subroutine elapse reads the internal timer the second time and calculates the elapsed time as the difference between the first and second counts. The main speed test routine is called speedCalibrate. The register cx is loaded with the number of times the IO read and one intervening instruction are executed. The initial value is IN_TRIES, which is set to 32 for 32 IO read instructions. IO reads are used rather than IO writes. The speed_check loop has 32 IO reads with just one loop of an intervening loop instruction, which includes a compare and decrement.

The speed_check2 loop executes the loop without any IO reads. The difference is the time for the IO reads which are subtracted out to get the time for just the intervening instructions. The number of intervening instructions is increased until the target HOW_FAST, which is 80 hex, is reached.

The delayFactor subroutine is called during normal operation when data is transferred to the external parallel port device, and a delay is needed to reach the target pulse width. The loop uses the same loop count determined by the speed test, and the loop instruction is the same instruction used in the test. Thus the added delay is nominally s the same as during the speed test.

Advantages of the Invention

The invention measures the actual speed of the AT bus accessing the parallel-port registers. Thus the invention can compensate for faster AT bus frequencies such as 10 or 12 MHz AT busses. This compensation occurs in software by increasing or decreasing the number of iterations of a delay loop between adjacent IO write instructions. Thus the invention is easily adaptable since the adjustment is made by the software rather than the hardware or firmware. The system BIOS does not have to be adjusted either.

The invention may also compensate for other factors affecting the speed of access to the parallel-port registers. Occasionally a user or manufacturer programs one or more wait states into AT bus accesses. These wait states slow down AT bus accesses by inserting an additional AT bus clock cycle. Often the user unwittingly adds the wait state while experimenting with the system settings in the BIOS. A manufacturer may add a AT bus wait state as a quick fix when the systems fail for no apparent reason. If the wait state appears to reduce failures, the systems are shipped with the wait state enabled. The invention can compensate for additional wait states by reducing the number of interations of delay instructions between adjacent IO writes, thus allowing the parallel port to still operate at maximum efficiency despite the additional wait state.

Having the timer on the external parallel-port device has the advantage that the PC's timers do not have to be used. The external timer also has the advantage of being more accurate since the AFD control signal directly triggers the external timer. The increased accuracy allows just a few or even a single measurement to be used rather than a larger number of measurements which are averaged. Thus the external timer can reduce the time required at boot-up to determine the AT bus speed. The PC then boots up more quickly, which users appreciate.

On the other hand the internal timer has the advantage of lower cost and complexity of the external parallel port device. Since the PC already contains several timers, one of these timers may be used for the AT bus speed test. The timer may be shared with another use such as the real-time clock or refresh generator since the timer can simply be read by the parallel-port driver software. The timer is not disturbed or altered by these reads. The driver software simply subtracts two timer readings to get the time elapsed.

ALTERNATE EMBODIMENTS

Several other embodiments are contemplated by the inventors. For example, the number of times the delay loop is executed, D, is incremented by 1 in the preferred embodiment, although larger increment values could be used, or even a variable increment value. Other parallel-port control signals besides or instead of AFD may use the invention to adjust their timing. The high pulse width may be adjusted separately from the low pulse width.

The 8254-compatable timer is often included within a large-scale integration (LSI) chip such as an integrated peripheral controller. A super-I/O chip may include all of the parallel-port registers. The external timer may be separate from the microcontroller or included within the microcontroller. The microcontroller itself may be implemented as a discrete microcontroller or the functions programmed into the microcontroller may be implemented directly in logic.

The routine of FIGS. 4A, 4B or 7A, 7B is executed during each boot-up of the host PC, although the iteration count could be saved and used rather than re-running the speed test at each boot-up. The routine can be executed by a call from the autoexec.bat file for DOS, or from the registry in Windows 95.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

APPENDIX

```
;/*------------------------------------------------
;
;    FILE      : IORDWR.ASM
;
;    PROGRAM   : DOS DEVICE DRIVER
;
;    REMARKS   : This file contains assembler language equivalents
;                to read and write to Penguin. This is for optimization
;
;    Written by OnSpec Electronic Inc.
;             3056 Scott Blvd.
;             Santa Clara, CA 95054
;             (408) 727-1819
;
;(c) 1993 OnSpec Electronic Inc.
;    ALL RIGHTS RESERVED.
;
; OnSpec Electronic Inc. PROPRIETARY INFORMATION
;
; $Date: 26 Oct 1995 18:02:00 $
; $Log: E:/VCS/DD/EGRET/IDE/CDROM/DRIVER/IORDWR.ASV $
;
;    Rev 1.5 26 Oct 1995 18:02:00 SREE
; 1. Speeded up Uni-D reads and PS/2 reads
; 2. checkSum Computing code changed
;
;    Rev 1.4 25 Oct 1995 10:35:38 SREE
; 1. Fixed changing Audio CDs
; 2. Fixed daisy chaining feature.
;
;    Rev 1.2 06 Oct 1995 15:12:10 SREE
; 1. Fixed changing Audio CDs
; 2. Fixed daisy chaining feature.
;
;    Rev 1.1 02 Oct 1995 9:21:54 SREE
; Changes for Edge mode reliability in PS2 mode
;
```

APPENDIX

```
;       Rev 1.0 21 Sep 1995 10:17:08 unknown
; Initial revision.
;
;       Rev1.6 08 Oct 1994 11:12:16 SREE
; 1. Added detection of SMC EPP and INTEL EPP chip-sets.
;
;
;       Rev 1.5 31 Aug 1994 11:54:56 SREE
; 1. This version tests for IDE drive before installing itself.
; 2. If no partitions are found, the driver will still install itself,
;    allowing FDISK program to partition the drive. When this happens,
;    the driver will warn the user that it does not find any
;    partitions.
; 3 If Egrets are inter-daisy chained, i.e. a mix of IDE and SCSI,
;    the individual drivers will automatically detect the relevant
;    units and only talk with those.
;
;
;       Rev 1.4 20 Jul 1994 9:47:40 unknown
; Minor enhancements . . .
;
;       Rev 1.3 05 Jul 1994 14:39:46 SREE
; 1. Major changes to allow INT13 support. Most of INT13 related logic
is
;    inINT13.C
; 2. Daisy chaining is allowed. For this we need to do repetitive selection
;    and de-selection.
; 3. We co-exist with Mobile driver if Mobile Disk is installed ahead of
us.
;
;       Rev 1.2 18 Jun 1994 16:08:34 SREE
; New and improved IO interface, has auto speed calibration and improved
; data handling capabilites . . .
;
;       Rev 1.1 31 May 1994 16:39:34 SREE
; First pass of supporting multiple parallel port types. Needs optimization.
;
;       Rev 1.0 04 Mar 1994 13:30:08 SREE
; First version of Egret IDE device drivers. A new file, INI.C has Egret
; select and de-select routines.
;
;       Rev 0.3 09 Feb 1994 10:45:34 SREE
; Added code for doing PS/2 and EPP detection.
;
;       Rev 0.2 14 Sep 1993 9:27:30 SREE
; Added some more tweaks.
;
;       Rev 0.1 03 Sep 1993 10:53:46 SREE
; Initial revision.
;
;--------------------------------------------------------------- */
_DATA segment word public 'DATA'
_d@     label   byte
;
; List of address pointers, all are in the same segment . . .
;
IFDEF LMOD
_egretAddrCycle dd    ?           ; Pointer to the address function
_egretReadByte  dd    ?           ; Pointer to the read function
_egretWrite     dd    ?           ; Pointer to the write function
_egretReadFast  dd    ?           ; Pointer to the fast read function
_egretWriteFast dd    ?           ; Pointer to the fast write function
ELSE
_egretAddrCycle dw    ?           ; Pointer to the address function
_egretReadByte  dw    ?           ; Pointer to the read function
_egretWrite     dw    ?           ; Pointer to the write function
_egretReadFast  dw    ?           ; Pointer to the fast read function
_egretWriteFast dw    ?           ; Pointer to the fast write function
ENDIF
_delay_parameter    dw   1
_delta_parameter    dw   ?
;--------------------------------------------------------------- */
; time equates
;--------------------------------------------------------------- */
TIMER       EQU 40h
LATCH_COUNT EQU 00h
IN_TRIES    EQU 32
HOW_FAST    EQU 60h LPT1        EQU 378h
TIMER       equ 40h
LATCH_COUNT equ 00h
_DATA ends
            extrn _nPrnPort: WORD
_TEXT segment public byte 'CODE'
IFDEF LMOD
            DGROUP group _DATA
ELSE
            DGROUP group _DATA,_TEXT
ENDIF
            assume cs:_TEXT,ds:DGROUP
INCLUDE IORDWR.INC
INCLUDE CPROC.INC
            public _egretAddrCycle
            public _egretReadWord
            public _egretReadByte
            public _egretWrite
            public _UpdtAddrPtrs
            public _speedCalibrate
            public _delay_parameter
            public _delta_parameter
            public _at_over_s_read
            public _delayFactor
            public _dlyIMillisec
            public _egretReadFast  ; Reads in a word, in AX
            public _egretWriteFast ; Writes a word, passed in AX
            public _UpdtFastAddrPtrs
;
; subroutine to get the current time from the 8254 timer
; The current time is returned in BX
CPROC       get_time
            push ax
            push dx
            cli              ; Turn interrupts off
            mov dx, TIMER + 03 ; Point to TIMER Address plus 3
            mov al, LATCH_COUNT ; Load in a 0 into AL
            out dx, al       ; Output to the TIMER port + 3
            mov dx, TIMER    ; Output to the TIMER port
            in al, dx        ; Read in the WORD from TIMER port
            mov bl, al
            in al, dx
            mov bh, al
            pop dx
            pop ax
            ret
EPROC       get_time
;
;subroutine to find out the elapsed time
; AX has the elapsed time
CPROC       elapse
            mov ax, bx
            call get_time    ; BX -> the current ticks
            sti              ; Interrupts back on
            xchg ax, bx      ; BX will be > AX usually . . .
            sub ax, bx       ; AX -> elapsed time
            jnc no_overflow
            xor ax, 0ffffh   ; Rolled over, get the magnitude
            inc ax
no_overflow: ret
EPROC       elapse
CPROC       _speedCalibrate
            push ax
            push bx
            push cx
            push dx
            mov _delay_parameter, 1
            mov cx, IN_TRIES ; Load Count in CX (=32 default)
            call get_time
            mov dx, LPT1     ; Read a byte using IN instruction
speed_check1: in al, dx
            loop speed_check1
            call elapse      ; Calculate the elapsed time
            push ax          ; Save the first result on stack
            mov cx, IN_TRIES
            call get_time
            mov dx, LPT1     ; Point to Print Status register
speed_check2: loop speed_check2
```

APPENDIX
-continued

```
        call elapse
        pop bx        ; Restore from the stack, 1st result
        sub bx, ax
        jnc we_overflow
        xor bx, 0ffffh   ; Rolled over, get the magnitude
        inc bx
we_overflow:
        mov _delta_parameter, bx  ;for testing only ...
        cmp bx, HOW_FAST
        jge no_adjust
;calculate the delay parameter for egret routines
        mov dx, HOW_FAST  ; Load the reference count again
        sub dx, bx        ; DX how much we are off from AT Bus
        xor cx, cx        ; Initialize the delay counter
try_again: inc cx         ; Keep incrementing the delay counter
        push cx
        call get_time     ; Get the time in BX
delay_io: loop delay_io   ; Wait here CX times
        call elapse       ; and calculate the delay in AX
        pop cx            ; Restore the delay counter
        cmp cx, 01        ; Is it the first timer ?
        jne not_first     ; If so, save the reference in SI
        mov si, ax
not_first: sub ax, si     ; First time, it is 0 ...
        jg bigger_than    ; AX -> delay due to loop instruction
        xor ax, ax        ; Reset AX
bigger_than: cmp dx, ax   ; Is it more than Adjustment factor
        jge try_again     ; Yes, loop again
        mov ax, cx        ; Load the delay factor for Division
        mov bx, IN_TRIES  ; Prepare to do the divide
        div bl            ;
        xor ah, ah
        cmp ax, 0
        je adjust_parm
        mov _delay_parameter, ax
        inc _delay_parameter
        jmp no_adjust
adjust_parm:
        mov _delay_parameter, 2  ; underrun ... set to 2
no_adjust: pop dx
        pop cx
        pop bx
        pop ax
        ret
EPROC   _speedCalibrate
;
; _delayFactor
;
CPROC   _delayFactor
        push cx
        mov cx,_delay_parameter
dly:    loop dly
        pop cx
        ret
EPROC   _delayFactor
_TEXT ends
        end
```

We claim:

1. An external device for connection to a parallel port of a personal computer (PC), the external device comprising:

a parallel-port connector for connecting to a parallel-port cable connected to the parallel port of the PC;

a data register, connected to the parallel-port connector, for storing data transferred from the PC to the external device;

a control register, connected to the parallel-port connector, for buffering control signals including a first control signal from the PC to the external device;

a status register, connected to the parallel-port connector, for driving status signals from the external device to the PC;

controller means, coupled to the data register, the control register, and the status register, for receiving data and commands from the PC to the external device;

an external timer, coupled to the controller means, for timing the first control signal from the control register, the external timer triggered by a first edge of the first control signal and halted by a second edge of the first control signal, the external timer outputting a count value in a digital format indicating an amount of time from the first edge to the second edge of the first control signal;

wherein the controller means further comprises transfer means for reading the count value in the digital format from the external timer and transferring the count value to the parallel port of the PC;

compare means for comparing the count value in the digital format to a target count value, the target count value being proportional to a target pulse width for the first control signal; and extension means, in the PC and responsive to the compare means, for extending a period of time between the first edge and the second edge of the first control signal, whereby the external timer in the external device measures a pulse width of the first control signal from the parallel port of the PC and wherein the pulse width of the first control signal is extended when the compare means indicates that the count value is less than the target count value.

2. The external device of claim 1 wherein the extension means comprises:

means for inserting delay instructions between adjacent IO write instructions that write to a parallel-port control register in the PC which drives the first control signal on the parallel-port cable, whereby the pulse width of the first control signal is extended by inserting delay instructions between adjacent IO write instructions.

3. The external device of claim 2 wherein the delay instructions comprise a loop, the extension means adjusting a number of times the loop is repeated between IO write instructions.

4. The external device of claim 3 wherein the extension means and the compare means comprise a parallel-port driver software routine executing on the PC.

5. The external device of claim 4 wherein the compare means is executed during initialization of the PC, and wherein the extension means is executed when data is transferred from the PC to the external device.

6. The external device of claim 5 wherein the first control signal is a signal to a printer causing the printer to auto line feed, the first control signal being an AFD control signal in the parallel port.

7. The external device of claim 1 further comprising:

reduction means, in the PC and responsive to the compare means, for reducing a period of time between the first edge and the second edge of the first control signal, wherein the pulse width of the first control signal is reduced when the compare means indicates that the count value is more than the target count value.

8. The external device of claim 7 wherein the reduction means comprises:

means for removing delay instructions between adjacent IO write instructions that write to a parallel-port control register in the PC which drives the first control signal on the parallel-port cable, whereby the pulse width of the first control signal is reduced by removing delay instructions between adjacent IO write instructions.

9. A method of determining the speed of an AT bus on a personal computer (PC) and adjusting timing of a first control signal for controlling data transfer on a parallel port on the PC, the method comprising:

(a) reading an internal timer on the PC for a first count value and storing the first count value;

(b) accessing a parallel-port register on the AT bus, the parallel-port register including a cell which drives the first control signal on the parallel port;

(c) executing a loop of n delay instructions;

(d) repeating in sequence steps (b) and (c) for a predetermined number of iterations;

(e) reading the internal timer on the PC for a second count value;

(f) obtaining the difference between the first count value and the second count value, the difference being an elapsed count;

(g) comparing the elapsed count to a target count, the target count being for a target elapsed time period for accessing the parallel-port register;

(h) when the elapsed count is less than the target count, increasing a number n of delay instructions in the loop of n delay instructions and repeating steps (a) through (g) in sequence;

(i) when the elapsed count is not less than the target count, saving the number n of delay instructions in the loop of n delay instructions and executing the loop of n delay instructions after each access of the parallel-port register, whereby accessing of the parallel-port register is tested and adjusted to meet the target elapsed time period.

10. The method of claim 9 wherein the internal timer on the PC is an 8254-compatable timer.

11. The method of claim 9 wherein accessing a parallel-port register on the AT bus comprises an I/O read instruction.

12. The method of claim 9 wherein accessing a parallel-port register on the AT bus comprises an I/O write instruction.

13. The method of claim 12 wherein the first control signal on the parallel port comprises an auto-line-feed AFD control signal used to advance paper in a printer, the AFD control signal signaling when data is being transferred out the parallel port.

14. The method of claim 13 wherein the step of:

(b) accessing a parallel-port register on the AT bus is repeated every 750 nanoseconds to generate a 750-nanosecond pulse-width for the auto-line-feed AFD control signal when the elapsed count is equal to the target count.

* * * * *